United States Patent [19]

Wamsley

[11] 4,248,565

[45] Feb. 3, 1981

[54] LIVESTOCK FEEDING APPARATUS

[76] Inventor: Donald Wamsley, Coalmont, Colo. 80430

[21] Appl. No.: 45,631

[22] Filed: Jun. 5, 1979

[51] Int. Cl.³ .............................................. B60P 1/00
[52] U.S. Cl. .................................. 414/518; 239/672; 241/283
[58] Field of Search ........... 414/501, 507, 518, 525 R; 239/659, 672; 241/101.7, 277, 283

[56] References Cited

U.S. PATENT DOCUMENTS

| 2,648,542 | 8/1953 | Wickell et al. | 239/659 X |
| 3,084,821 | 4/1963 | Knight | 414/518 X |
| 3,642,254 | 2/1972 | Ternes | 259/46 |
| 3,656,638 | 4/1972 | Hutton | 239/679 X |
| 4,037,740 | 7/1977 | Wood et al. | 414/518 |

Primary Examiner—Robert B. Reeves
Assistant Examiner—Gene A. Church
Attorney, Agent, or Firm—Hugh H. Drake

[57] ABSTRACT

For distributing feed to livestock, a vehicle frame is movable along the ground and upstanding therefrom is a bin into which the feed initially is received. An opening is defined in one wall of the bin. A conveyor effectively forms at least a portion of another wall of the bin and is movable to urge that feed outwardly from the bin through the opening. Upstanding from the frame is a carriage spaced outwardly of the bin from the opening and toward which the feed is urged by the conveyor. There is at least one and preferably are two lateral slots defined between the carriage and the bin and through which the feed is to be dispensed. A repetitively-reciprocating dispenser is mounted on the side of the carriage facing the opening for dispensing through the lateral slots incremental portions of the feed as urged toward the carriage by the conveyor. The specifics involve tining of a feed such as hay outwardly through the lateral slots as urged against tines by the conveyor.

12 Claims, 12 Drawing Figures

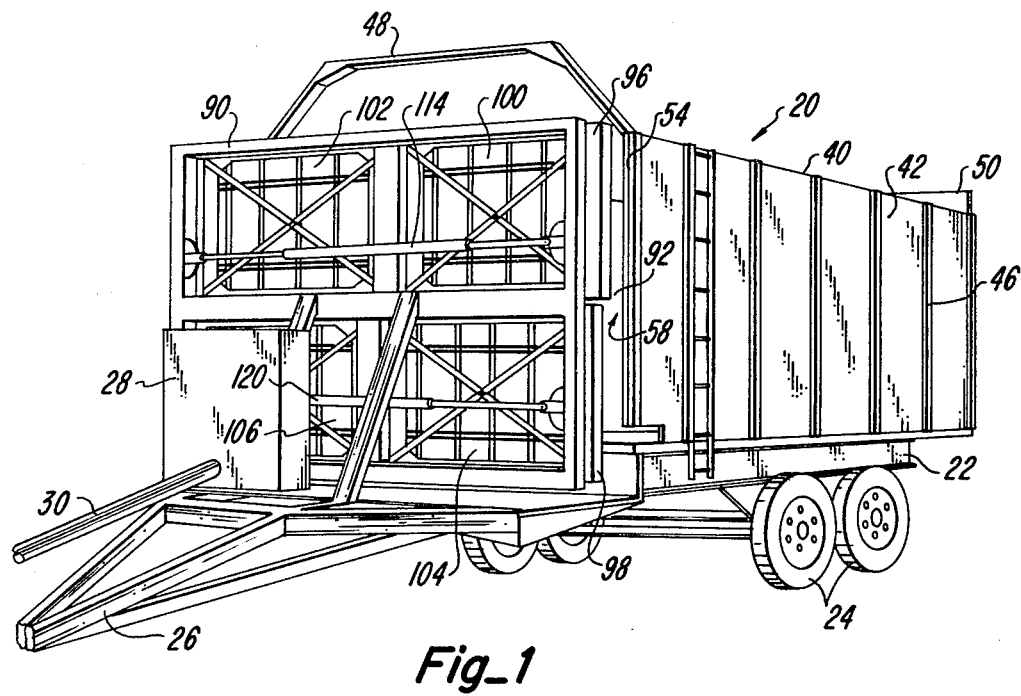
Fig_1
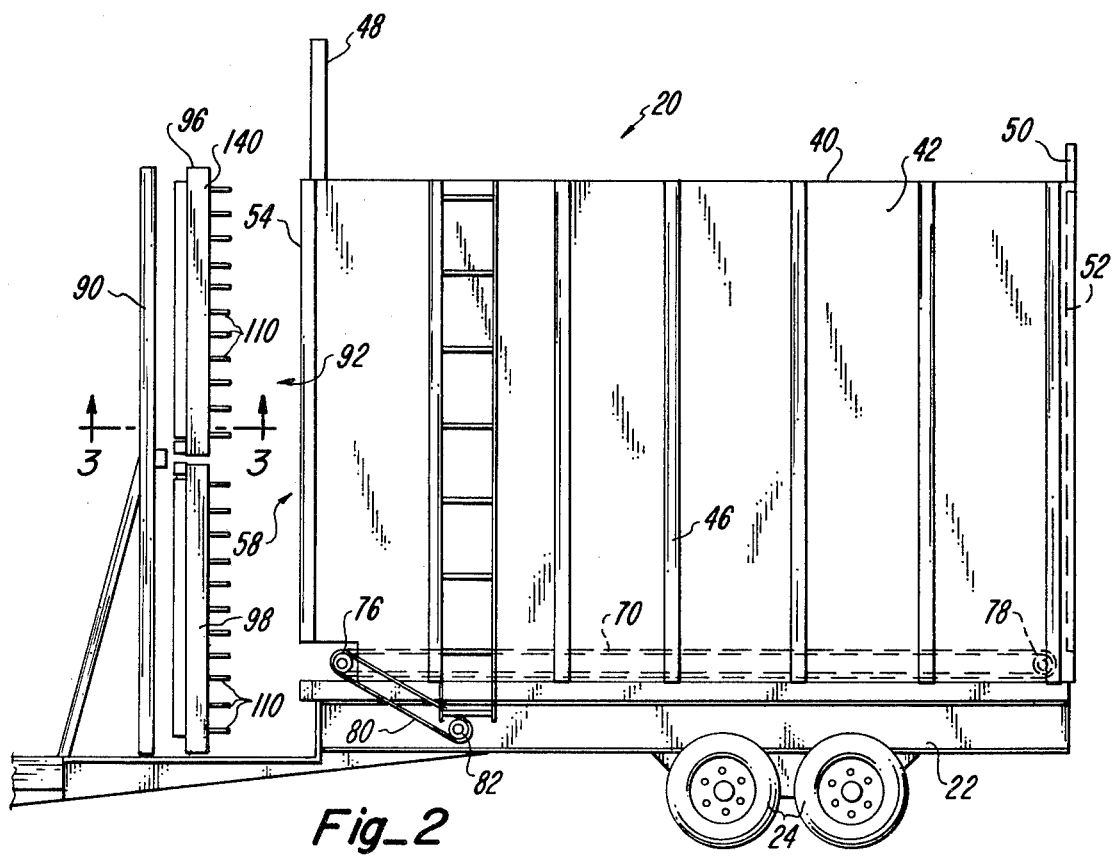
Fig_2

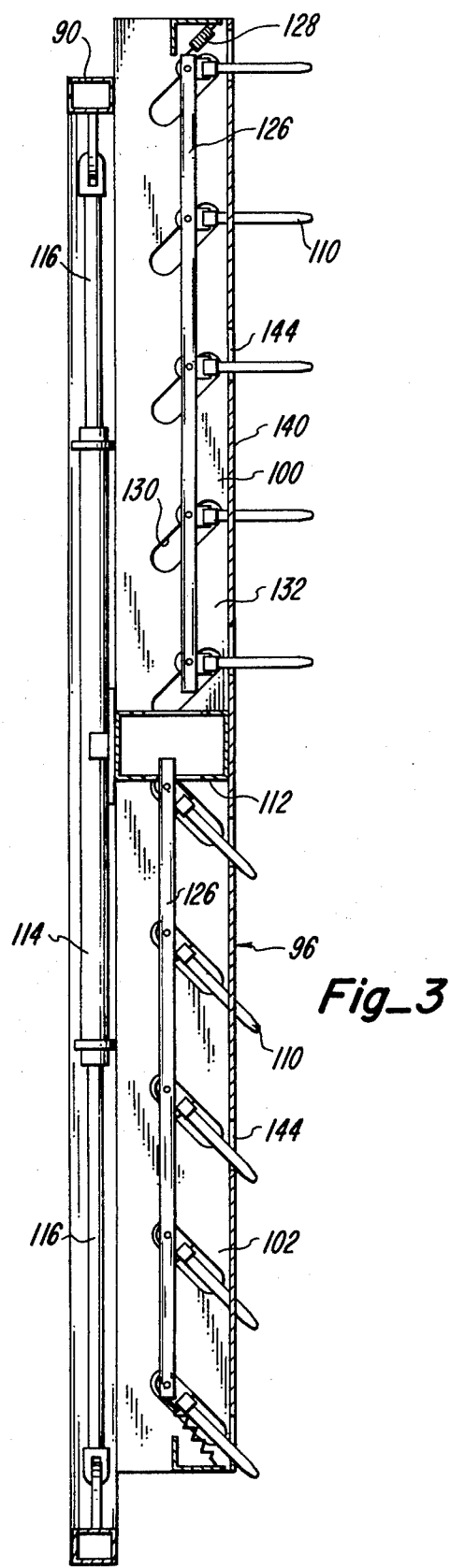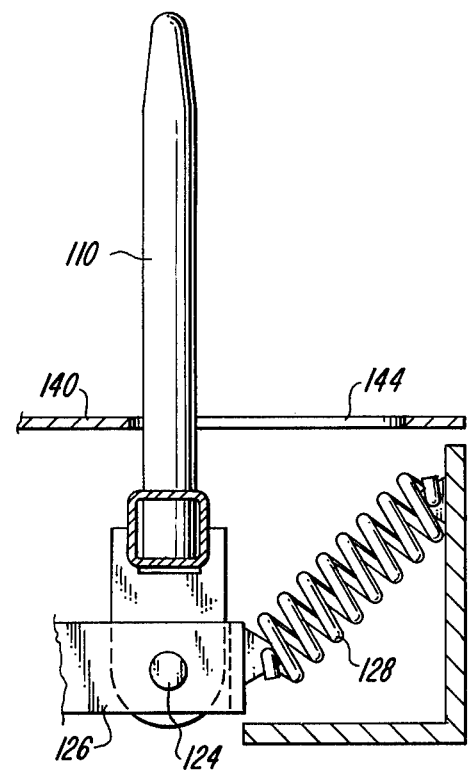
Fig_3
Fig_4

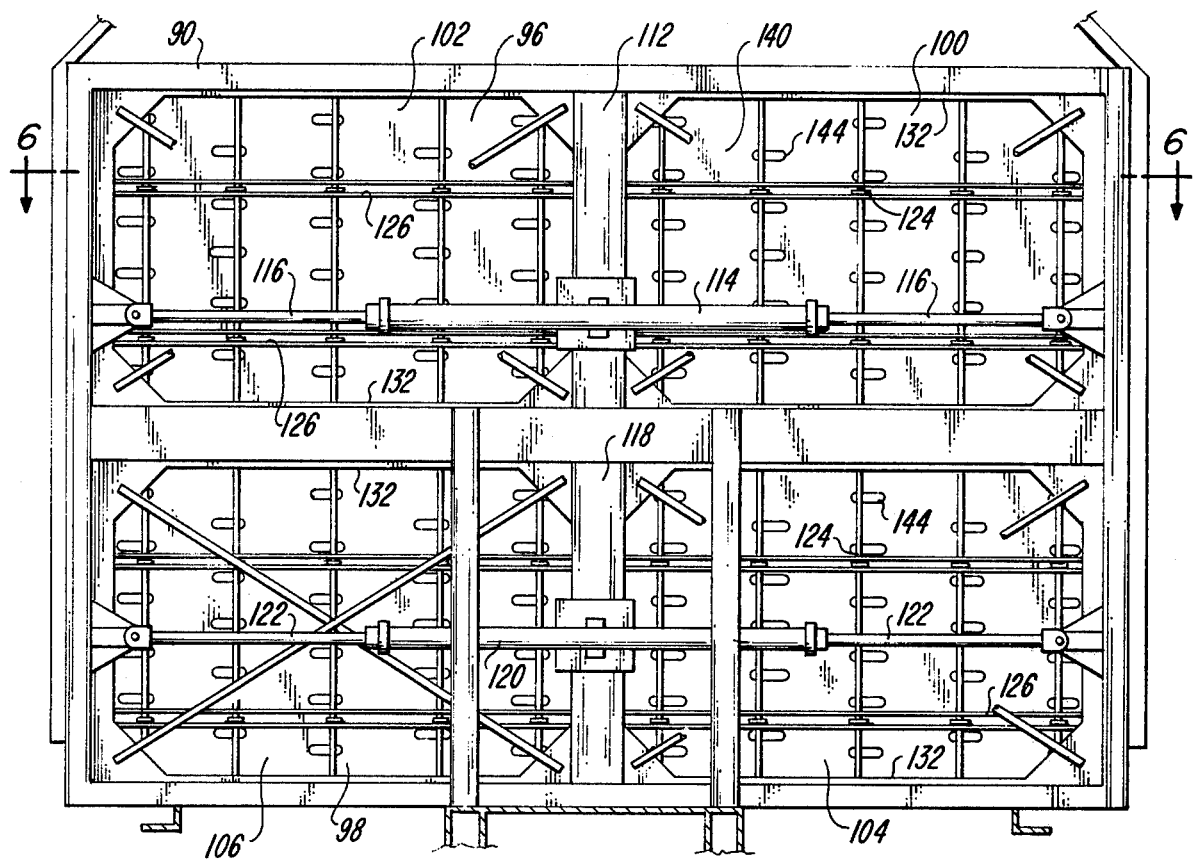
Fig_5
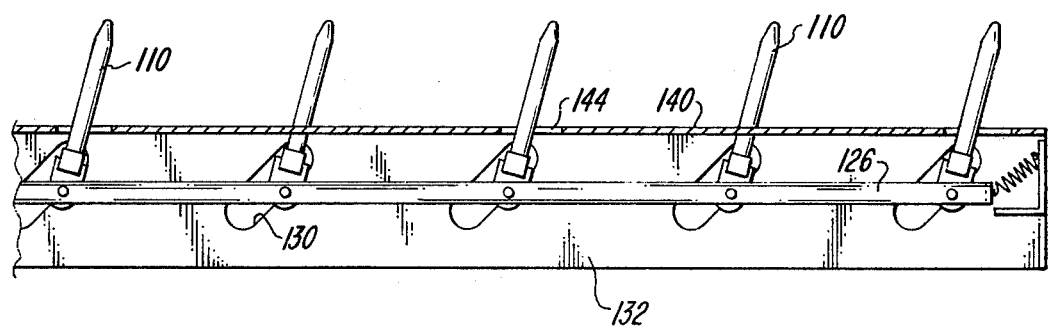
Fig_6

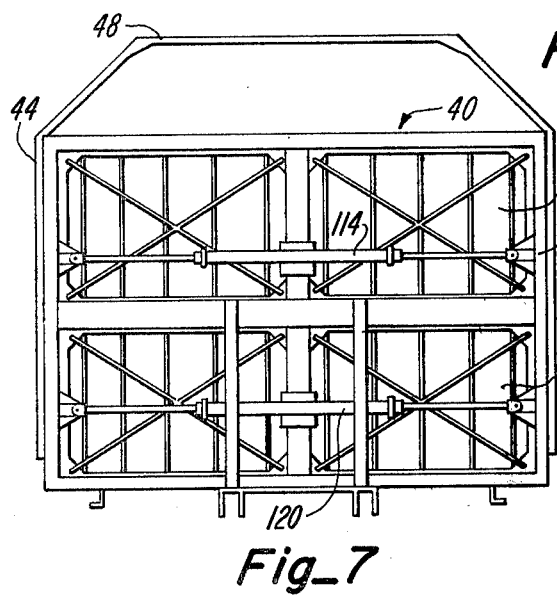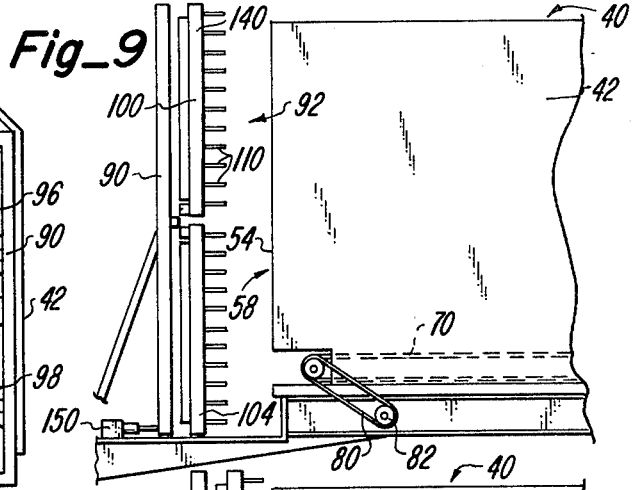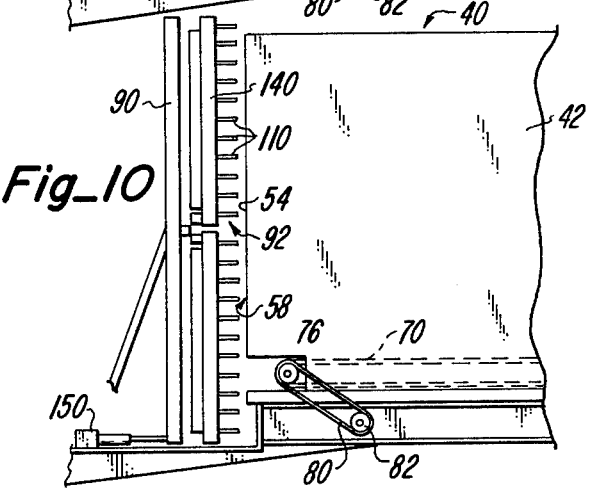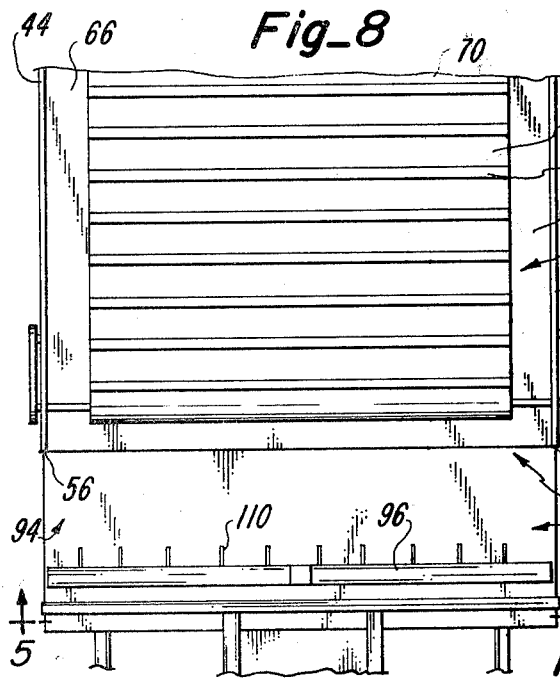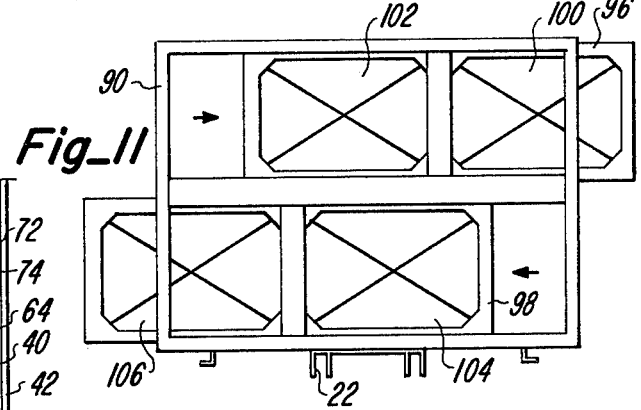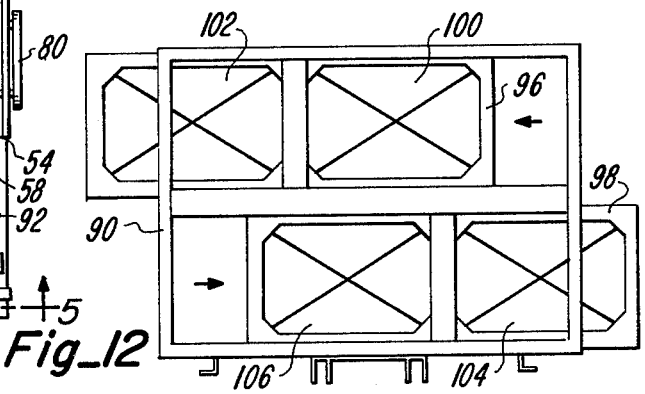

LIVESTOCK FEEDING APPARATUS

The present invention pertains to a livestock feeding apparatus. More particularly, it relates to a dispenser for feeding hay or the like to livestock.

Historically, livestock producers have used feedstuff such as hay and alfalfa for the feeding of livestock during such times as when open grazing upon pasture is not desired or available. Typically, hay has been grown in a meadow, thereafter cut or mowed and then gathered and consigned for later feeding to such livestock. One mode of preservation of such feed has been to gather it by various means after mowing and piling it in stacks. At least in earlier times, the feed was taken, as by a pitchfork, from the stack and distributed to the livestock. More recent approaches have involved placing the stacked hay upon a vehicle and therefrom causing it to be distributed in a manner that would enable at least somewhat efficient devourment of the feed by the livestock. One example of such an approach is that disclosed in U.S. Pat. No. 3,656,638-Hutton et al, wherein loose hay received within a bin from a stack is forced rearwardly of the bin, mounted on wheels, and, at the rear, flung outwardly by rotating vanes that dig into the mound of hay. Another example is shown in U.S. Pat. No. 3,642,254-Ternes wherein loose feed is placed within a bin, agitated to help insure uniform delivery, delivered by an auger to a forward position and thereafter dropped through a chute.

Apparatus such as that disclosed in the foregoing prior art have enabled the livestock feeder to distribute loose hay and the like in elongated rows so that the livestock being fed tend to distribute themselves along any such row and thereby achieve a better degree of feeding efficiency. This contrasts with the possibility of simply dumping a quantity of feed in a confined location. In the latter case, the more aggressive animals tend to take over from others of the animals and there is more undesired trampling of the dispensed feed. It also contrasts with the alternative approach of first baling the hay or the like and then later opening the bales for the purpose of distributing the feed.

In view of the foregoing, it is a general object of the present invention to provide a new and improved apparatus for distributing livestock feed.

It is another object of the present invention to provide livestock feed apparatus which yields recognizable efficiency in use for feeding the livestock.

A further object of the present invention is to provide a new and different apparatus of the kind under discussion which is justified as to cost of manufacture.

An apparatus for distributing a livestock feed, such as hay, includes a vehicle frame movable along the surface of the ground and from which a bin upstands, the feed initially being received into the bin. An opening is defined in one wall of the bin. A conveyor effectively forming at least a portion of another wall of the bin, preferably at the bottom, is movable to urge the feed outwardly from the bin through the opening. Upstanding from the frame is a carriage that is spaced outwardly from the opening and toward which the feed is urged by the conveyor. There is at least one lateral slot defined between the carriage and the bin and through which the feed is to be dispensed. A repetitively-reciprocating dispenser is mounted on the side of the carriage facing the opening so as to dispense through the slot incremental portions of the feed urged toward the carriage by the conveyor.

The features of the present invention which are believed to be patentable are set forth with particularity in the appended claims. The organization and manner of operation of the invention, together with further objects and advantages thereof, may best be understood by reference to the following description taken in connection with accompanying drawings, in the several figures of which like reference numerals identify like elements, and in which:

FIG. 1 is a perspective view of a feed distributing apparatus constructed in accordance with the present invention;

FIG. 2 is a fragmentary side elevational view of the apparatus shown in FIG. 1;

FIG. 3 is a cross-sectional view taken along the line 3—3 in FIG. 2;

FIG. 4 is an enlarged and fragmentary cross-sectional view of a sub-assembly shown in FIG. 3;

FIG. 5 is a fragmentary and enlarged front-elevational view taken along the line 5—5 in FIG. 8;

FIG. 6 is a fragmentary and enlarged elevational view taken along the line 6—6 in FIG. 5;

FIG. 7 is a fragmentary front-elevational view taken from the left in FIG. 2;

FIG. 8 is a fragmentary top plan view;

FIG. 9 is a fragmentary side-elevational view;

FIG. 10 is a view similar to FIG. 9;

FIG. 11 is a schematic front elevational view; and

FIG. 12 is a view similar to FIG. 11 but with different component positions.

In the specific embodiment illustrated, an apparatus 20 for distributing livestock feed is in the form of a trailer having an undercarriage 22 mounted upon wheels 24 and from the front end of which projects a tongue 26 for coupling to a pulling tractor or the like (not shown). Mounted on the forward end of carriage 22 is a hydraulic pump and fluid reservoir unit 28, the pump in this case being driven by a power takeoff 30 driven by the towing vehicle. For controlling the actuation and movement of various components yet to be described, a plurality of hydraulic lines lead from carriage 22 to controls mounted at the rear of the pulling vehicle in a position available to the operator of the latter. The variety of hydraulic hoses and couplings are omitted from the mechanical views in the drawings, because they would obscure the presentation of structural details of the mechanical arrangements and also because the hydraulic driving system is, as such, a state of the art technique.

Alternatively, apparatus 20 could be entirely self-propelled. That is, an engine may be mounted upon carriage 22 and coupled through a suitable transmission or transmissions to drive traction wheels 24 as well as to power a hydraulic or equivalent other system to effect motion of the other components yet to be described. In that case, of course, at least one of the traction wheels would need to be steerably controlled and a control position for an operator would have to be added. In any case, the different control valves or equivalent mechanisms are placed so as to be reasonably convenient to manipulation by the operator. Although, for the version specifically illustrated, they may be located upon the towing vehicle and hydraulically coupled to apparatus 20, the preferred arrangement would be to locate all such control on a standard which projects upwardly from tongue 26 and which is in reach of the operator situated on the tractor or the like which serves as the towing vehicle.

In any case, apparatus 20 is intended for the distribution over the ground of a livestock feed such as hay. In use as a livestock feed, "hay" is normally thought of as being composed of mowed or otherwise cut native grasses, seeded grasses, legumes such as alfalfa or other vegetative products grown in such manner that they may be gathered, stored and then later fed to livestock. In some cases, such feed is baled or otherwise compressed into cubes, rolls or stacks for subsequent ease of movement to a desired feeding location. Apparatus 20 is intended to handle different forms of stored hay and accomplish desired distribution to and among a herd of livestock. It is particularly suitable for such distribution of hay that originally has been collected and piled in loose form. However, it also is utilizable with hay which has been baled for storage, provided that any such baled hay is not bound by a strong wire or the like which would interfere with the operation which is to be described hereinafter.

Upstanding from carriage 22 is a bin 40 into which the feed initially is received. Bin 40 includes spaced-opposed lateral side walls 42 and 44 in the form of upright rigid panels. As herein specifically embodied, panels 42 and 44 are each formed of sheet steel having an unobstructed interior surface to form an interior wall along which the hay may be moved and provided with reinforcement in the form of exteriorly-located longitudinally-spaced studs 46. Additional rigidity is provided by an overhead bridge 48 that joins the forward-upper corners of panels 42 and 44 together with a cross strut 50 which rigidly joins the rearward-upper corners of those walls. Also included at the rear of bin 40 is an openable door 52 which serves to confine hay stored within bin 40 as well as to permit its discharge through the opening defined by that door upon reverse movement of a component yet to be described. Feed to be stored within bin 40 can either be loaded into the essentially open top of that bin or inserted through the rear opening between side walls 42 and 44 when door 52 is opened. The forward vertical margins of walls 42 and 44, respectively denominated by the numerals 54 and 56, and together with the bottom wall of bin 40, define a forwardly facing opening 58.

Although ledges 64 and 66, that project inwardly from the lower margins of side walls 42 and 44, form a portion of the bottom wall of bin 40, that bottom wall is effectively formed by a conveyor 70 composed of a belt 72 and its upstanding ribs 74. Conveyor 70 is encircled over a power roller 76 and an idler roller 78, with power roller 76 being driven by a chain 80 from a sprocket 82 which, in turn, is driven in rotation either directly from power takeoff shaft 30 or indirectly by a hydraulic motor powered from unit 28. As already indicated, the specific means for supplying such driving power is within the realm of the state of the art and is not a part of the present invention. All that is required is that conveyor 70 be movable to urge feed stored within bin 40 outwardly from that bin through opening 58. In the alternative, it is also desirable that conveyor 70 be movable in the reverse direction so as to unload feed from bin 40 upon opening of door 52.

A carriage 90 upstands from frame 22 and is spaced outwardly of bin 40 from opening 58. Feed within bin 40 is urged by conveyor 70 toward carriage 90. The outward spacing of carriage 90 from bin 40, and thus from marginal edge portions 54 and 56, serves to define slots 92 and 94 located between carriage 90 and bin 40. It is from slots 92 and 94 that feed is to be dispensed.

Mounted upon the side of carriage 90 facing opening 58 are a pair of repetitively-reciprocating dispensers 96 and 98 for delivering through slots 92 and 94 incremental portions of the feed urged toward carriage 90 by conveyor 70. In general, each of dispensers 96 and 98 shuttles back and forth laterally so as to force hay respectively out of slots 92 and 94 as that hay or other feed is presented to the dispenser by reason of movement of conveyor 70 so as to force the entire load of hay generally toward carriage 90. Conceptually, only one laterally reciprocable dispenser is needed to engage and move feed, urged theretoward by conveyor 70, outwardly of a single slot provided in one side of the apparatus so as to dispense the feed in a row upon movement of the apparatus. By providing space-opposed slots 92 and 94 for the ultimate dispensation of feed, and remembering that apparatus 20 is moving forward, it is apparent that one advantage of the preferred embodiment is that the feed is distributed along two rows so as to accommodate the distribution of the herd being fed along a wider area for a given movement of the apparatus.

As indicated in FIGS. 11 and 12, dispenser 96 forces feed presented by conveyor 70 to one side of apparatus 20 at the same time as dispenser 98 forces feed to the other side of the vehicle. This manipulation is repetitively alternative, so that one of the dispensers always is forcing feed to be distributed laterally on each side of the vehicle and in a correlated manner.

Moreover, each of dispensers 96 and 98 effects delivery of oncoming feed through a respective one of slots 92 and 94 upon each movement of that dispenser in a given direction. To this end, dispenser 96 is separated into segments 100 and 102, while dispenser 98 is separated into segments 104 and 106. Segments 100 and 104 are devised to project hay presented thereto outwardly through slot 92, while segments 102 and 106 are arranged to propel hay through the opposite slot 94. In an alternative, all of segments 100, 102, 104 and 106 may be combined so that there is a single shuttle apparatus carried by frame 90 and caused to reciprocate back and forth laterally so as alternately to dispense the oncoming feed from slots 92 and 94. Moreover, the arrangement may be so simplified that there is only one lateral slot, such as one of slots 92 and 94, with the entire distribution being from a single dispensing mechanism through that one slot on one side of apparatus 20.

In the preferred embodiment, however, the feed is continuously distributed through both of slots 92 and 94. To this end, the combination of the upper pair of segments 100 and 102 is delivering feed to one side through one of the slots, while the complementary pair of segments 104 and 106 is delivering feed through the other one of the slots. That sequence then reverses so that the same respective pairs of segments are cooperating to deliver feed through the correspondingly opposite ones of the respective slots. Within each of the upper and lower pairs of the segments, one is at any given time being moved into a reloading position while the other is discharging feed through its corresponding slot. That is, when segment 100 is delivering feed through slot 92, segment 102 is being retracted into a position so as to prepare for delivering a successive increment of the oncoming feed through slot 94.

To accommodate side-wise delivery of the oncoming feed, each of the segments is provided with an array of tines 110 so arranged that each tine is capable of forking into the presented feed and forcing the same toward the respective one of slots 92 and 94 as the segment carrying that tine is moved toward the corresponding slot.

In more detail, segments 100 and 102 are commonly supported to slide laterally within frame 90 and are secured from an upright girder 112. Girder 112 is tied to the center of a double-acting ram 114 from each end of which projects a piston 116 tied at its outer end to a laterally marginal portion of frame 90. Thus, actuation of ram 114 in alternative lateral directions serves to drive segments 100 and 102 in alternative opposite directions as illustrated by comparison between FIGS. 11 and 12. Similarly, segments 104 and 106 are carried upon a girder 118 secured to the middle of a ram 120 which also is of the double-acting type and has its oppositely directed pistons 122 also tied to frame 90 so as to cause reciprocation in alternative directions of segments 104 and 106 as also shown in FIGS. 11 and 12.

Each tine 110 is pivotally mounted on its base end as at 124 to a bar 126 which is biased at each end by a spring 128 to a nominally-centered position. As shown, one of bars 126 in each segment serves to drive, through a common axle at 124, a plurality of the ones of tines 110 that are in vertically-spaced relationship. That is, all of tines 110 in each of the segments are constrained by the common axle 124 to move in unison. All of axles 124 are constrained within angled slots 130, in this case oriented at an angle of about 45 degrees relative to the fore and aft of apparatus 20, and located in cross bars 132 in each of the segments. These slots serve to permit a collapsing inwardly of the respective segments of the coupled ends of each of tines 110 as those tines are deflected to one side in a manner to be described.

Disposed laterally of carriage 90 and spaced toward opening 58 from that carriage, so as to be located somewhat in the region of the mid-portion of each of tines 110, is a shield 140 through which tines 110 project. Formed into shield 140 individually and in association with each of tines 110 are a corresponding plurality of laterally elongated slots 144. The end of each of slots 144 innermost toward the longitudinal center of apparatus 20 is so aligned with respect to its associated one of tines 110 as to confine that tine to a lateral swinging movement such that it projects rearwardly out of apparatus 20 directly toward opening 58. On the other hand, the mounting mechanism for each such tine, including axle 124 and spring-biased bar 126 as well as the position and extent of each slot 144, is such as to allow that tine to swing outwardly of the longitudinal axis of apparatus 20 so as to be deflected toward the major plane of shield 140. At the same time, the provision of angled slots 130 together with the freedom of movement of bar 126 permits the tines to be recessed within slots 144 upon swinging of the tines outwardly toward a collapsed position. That is, each tine is capable of being swung over to one side and sort of out of the way at the same time as it is withdrawn through shield 140 in significant part.

As a result of the immediate foregoing, each outward movement of one of the segments, toward which feed is being urged through opening 58 by conveyor 70, results in respective tines being engaged with the oncoming feed and urged to a position against the centrally inward corner of their respective slot 144 so as to be held in an outstanding position and thereby engage a maximum amount of the feed for urging the latter outwardly through the respective ones of slots 92 or 94. On the other hand, when a segment carrying a particular tine subsequently is reciprocated inwardly, that tine carried thereby is enabled to collapse within shield 140 to an orientation where it does not engage the oncoming feed. Upon the completion of inward movement of that segment, and its subsequent beginning of outward movement, each of the tines it carries will poke into and again engage the feed and thereafter assume a position essentially perpendicular to shield 140 thereby to grab and propel a maximum amount of the oncoming feed toward the associated one of the slots.

Preferably, the widths, longitudinal of apparatus 20, of slots 92 and 94 are adjustable. As specifically disclosed only in FIGS. 9 and 10, this is accomplished by supporting frame 90 movably over a front apron on carriage 22 and changing the position of frame 90 by operation of a ram unit 150. The purpose of the adjustment provided by ram unit 150 is to vary the size of output opening presented to the ultimately delivered feed. Alternatively, slots 92 and 94 may be adjusted in width by means of a "sliding-door" type of additional panel member associated with each of marginal edge portions 54 and 56 at the front of bin 40.

In another alternative, the distance by which shield 140 is located from opening 58 is made adustable so that the distance which each one of tines 110 projects through shield 140 may be varied in order to afford additional control of the rate of feed through slots 92 and 94. Of course, that only requires a separate mounting frame for shield 140 and its adjustability relative to frame 90 by means of peripherally spaced rams or other suitable telescopic or equivalent devices. Along the same line, bars 126 and axles 124 may be mounted from separate substructures so as to enable their horizontal movement as a unit toward and away from shield 140.

In one overall optional alternative, it is clear that the entire dispensing mechanism may be mounted at the rear of the wagon or the self-propelled vehicle. Additionally, conveyor 70 may be formed into the side walls of bin 40, although it appears to be preferable to locate it as all or part of the bottom wall in order to take advantage of the weight of the feed in achieving movement thereof toward the actual dispensing apparatus.

Depending upon the amount of moisture included within stacked feed such as hay, and also as affected by ambient atmospheric conditions, there may be a tendency of feedstuff loaded within bin 40 to form into "lumps" that may interfere with even distribution out of slots 92 and 94. In that case, it may be desirable to include elongated tines of a rigid or agitating form that project inwardly within the confines of bin 40 either from the side walls or from the top.

It should be understood that apparatus of this kind cannot be lightly constructed. The equivalent of only twenty-five ordinary bales of hay can weigh in excess of a ton. With the apparatus being of a size to carry a load initially of many tons, the walls of bin 40 and the structural elements of the dispenser mechanism ought to be rugged. Once properly constructed, however, an apparatus of the kind described is fully capable of stocking many tons of hay and thereafter enabling a single operator to distribute it efficiently and substantially uniformly over long rows so as most appropriately to feed large herds of livestock.

It is also to be understood that the power unit driving sprocket 82 is adjustable in order to permit selection of the speed of conveyor 70. Similarly, the speed of actuation of rams 114 and 120 is adjustable for the purpose of varying the ultimate rate at which the feed is dispensed.

While particular embodiments of the invention have been shown and described, and numerous alternatives and modifications have been revealed, it will be obvious to those skilled in the art that changes and modifications may be made without departing from the invention in its broader aspects. Therefore, the aim in the appended claims is to cover all such changes and modifications as fall within the true spirit and scope of the invention.

I claim:

1. Apparatus for distributing a livestock feed such as hay, comprising:
   a vehicle frame movable along the surface of the ground;
   a bin upstanding from said frame and into which said feed initially is received;
   means defining an opening in one upright end wall of said bin;
   a conveyor effectively forming at least a portion of a bottom wall of said bin and movable to urge said feed outwardly from said bin through said opening;
   an upright carriage upstanding from said frame, spaced outwardly of said bin from said opening and toward which said feed is urged by said conveyor, at least one lateral and vertically-oriented slot being defined between said carriage and said bin and located in correspondence with a side of said frame so that feed may be dispensed through said slot alongside said vehicle as the latter is moving;
   and a repetitively-reciprocating dispenser mounted on the side of said carriage facing said opening for dispensing through said slot incremental portions of said feed urged toward said carriage by said conveyor.

2. Apparatus as defined in claim 1 in which said bin includes an entrance spaced opposite to said opening, and in which said entrance is closable by a door.

3. Apparatus as defined in claim 1 in which said bin includes an entrance spaced opposite to said opening, and in which said conveyor is reversible in direction of movement.

4. Apparatus as defined in claim 1 in which said dispenser includes an array of tines engageable with said feed for pushing said feed through said slot.

5. Apparatus as defined in claim 4 in which said dispenser further includes means for adjusting the degree of engagement of said tines with said feed urged toward said carriage to vary the rate at which said feed is delivered through said slot.

6. Apparatus as defined in claim 1 which includes means for adjusting the size of said slot.

7. Apparatus for distributing a livestock feed such as hay, comprising:
   a vehicle frame movable along the surface of the ground;
   a bin upstanding from said frame and into which said feed initially is received;
   means defining an opening in one wall of said bin;
   a conveyor effectively forming at least a portion of another wall of said bin and movable to urge said feed outwardly from said bin through said opening;
   a carriage upstanding from said frame, spaced outwardly of said bin from said opening and toward which said feed is urged by said conveyor, at least one lateral slot being defined between said carriage and said bin and through which said feed may be dispensed;
   a repetitively-reciprocating dispenser mounted on the side of said carriage facing said opening for dispensing through said slot incremental portions of said feed urged toward said carriage by said conveyor;
   means defining a second lateral slot spaced opposite said first slot, between said carriage and said bin, and through which said feed also may be dispensed;
   and in which said dispenser effects delivery of said feed through both of said slots.

8. Apparatus as defined in claim 7 in which said dispenser includes a lower portion effecting delivery of said feed through a first one of said slots and an upper portion, disposed above said lower portion, effecting delivery of said feed through the second one of said slots.

9. Apparatus as defined in claim 8 which further includes means for effecting parallel operation of said lower and upper portions in order to effect conjoint delivery from a common one of said slots.

10. Apparatus as defined in claim 7 in which there are two such dispensers and in which each of said dispensers effects delivery through one of said slots upon each movement thereof in each direction.

11. Apparatus for distributing a livestock feed such as hay, comprising:
    a vehicle frame movable along the surface of the ground;
    a bin upstanding from said frame and into which said feed initially is received;
    means defining an opening in one wall of said bin;
    a conveyor effectively forming at least a portion of another wall of said bin and movable to urge said feed outwardly from said bin through said opening;
    a carriage upstanding from said frame, spaced outwardly of said bin from said opening and toward which said feed is urged by said conveyor, at least one lateral slot being defined between said carriage and said bin and through which said feed may be dispensed;
    a repetitively-reciprocating dispenser mounted on the side of said carriage facing said opening for dispensing through said slot incremental portions of said feed urged toward said carriage by said conveyor;
    said dispenser including an array of tines engageable with said feed for pushing said feed through said slot;
    said dispenser further including means for adjusting the degree of engagement of said tines with said feed urged toward said carriage to vary the rate at which said feed is delivered through said slot;
    a shield mounted on said dispenser and having a plurality of apertures through which individual different ones of said tines project toward said feed;
    and means for varying the extent of such projection by said tines.

12. Apparatus for distributing a livestock feed such as hay, comprising:
    a vehicle frame movable along the surface of the ground;
    a bin upstanding from said frame and into which said feed initially is received;
    means defining an opening in one wall of said bin;
    a conveyor effectively forming at least a portion of another wall of said bin and movable to urge said feed outwardly from said bin through said opening;

a carriage upstanding from said frame, spaced outwardly of said bin from said opening and toward which said feed is urged by said conveyor, at least one lateral slot being defined between said carriage and said bin and through which said feed may be dispensed;

a repetitively-reciprocating dispenser mounted on the side of said carriage facing said opening for dispensing through said slot incremental portions of said feed urged toward said carriage by said conveyor;

said dispenser including an array of tines engageable with said feed for pushing said feed through said slot;

and means for projecting said tines toward said feed upon movement of said dispenser toward said slot and for withdrawing said tines away from said feed upon movement of said dispenser away from said slot.

* * * * *